United States Patent [19]

Hinchliffe

[11] Patent Number: 4,488,791

[45] Date of Patent: Dec. 18, 1984

[54] HYDRODYNAMIC SKYLIGHT APPARATUS

[76] Inventor: Glenn S. Hinchliffe, 984 Van Dyke St., Laguna Beach, Calif. 92651

[21] Appl. No.: 357,162

[22] Filed: Mar. 11, 1982

[51] Int. Cl.³ .................. E04B 7/18; G02B 27/00; G02B 5/20

[52] U.S. Cl. .................................... 350/582; 52/200; 134/34; 350/258

[58] Field of Search ................ 350/582–590, 350/258; 52/200; 134/34, 36; 239/16–18, 20; 362/96, 149

[56] References Cited

U.S. PATENT DOCUMENTS

| | | | |
|---|---|---|---|
| 2,425,060 | 8/1947 | Gildehaus | 52/200 |
| 3,744,873 | 7/1973 | Jamison | 350/584 |
| 3,837,916 | 9/1974 | Omachi | 134/34 |
| 4,123,883 | 11/1978 | Barber, Jr. et al. | 52/200 |
| 4,193,237 | 3/1980 | Jankowski | 52/200 |
| 4,352,149 | 9/1982 | Stetler | 362/96 |

FOREIGN PATENT DOCUMENTS 109222  8/1979  Japan .................. 52/200

WO80/2104 10/1980 PCT Int'l Appl. .......... 134/34

Primary Examiner—William H. Punter
Attorney, Agent, or Firm—Francis X. LoJacono

[57] ABSTRACT

A hydrodynamic skylight apparatus employed for use on building roof structures, so as to transmit in a controlled manner solar light and heat into the interior areas. The apparatus comprises a peripheral frame structure to support one or more transparent or translucent panels. A central support strut is employed when more than one panel is mounted. A sealing member is interposed between the panels and the flange members, whereby there is defined a reservoir having a fluid inlet and outlet. The side walls further include support brackets defining drain channels, the channels being arranged to be mounted to the part of the roof structure where the skylight is to be mounted. Additional embodiments include a pump-and-filter system and spray bars whereby water can be selectively allowed to flow into the reservoir, either intermittently or continuously as may be desired.

9 Claims, 6 Drawing Figures

4,488,791

HYDRODYNAMIC SKYLIGHT APPARATUS

BACKGROUND OF THE INVENTION

1. Field of the Invention

This invention relates generally to a skylight fixture mounted in the roof of a building structure, and more particularly to a hydrodynamic skylight apparatus that includes a continuous flow of fluid over the glass or other translucent-type panels.

2. Description of the Prior Art

It is well known in the art that various problems and difficulties are being encountered in providing suitable means for cleaning the transparent or translucent panels of skylight fixtures, particularly if the panels are mounted in a relatively horizontal arrangement.

Many types of skylight fixtures are presently in use to allow the sunlight to penetrate or shine into given areas or rooms. Since the usual locations for such fixtures are over openings formed in roof structures, they are not easily accessible for frequent cleaning.

Skylight fixtures formed having flat transparent or translucent panels are normally mounted at an incline. That is, a panel would generally be structured at an incline, whereby rainwater is allowed to drain from the panel and wash it in the process. However, this arrangement does not provide a means for preventing glass or other translucent panels from accumulating soil and debris, particularly in those climates with relatively little rainfall.

A more common skylight unit is the bubble-type which prevents water from pooling and causing stagnation. However, this type of panel does not resolve the problem of inaccessibility for cleaning. Also, many feel that the bubble-type skylight is not aesthetically pleasing—and thus not architecturally desirable.

Accordingly, it will be readily understood that the present invention as herein shown and described will provide a constructive novelty that solves the above-mentioned problems, and will at the same time provide an aesthetic value not obtainable heretofore.

SUMMARY OF THE INVENTION

The present invention has for an important object to overcome the aforesaid problems, and to further provide a new and improved skylight apparatus that is so structured as to be mountable in either a flat-horizontal plane or at an inclined plane, a water system being included to establish a continuous means for cleaning the transparent or translucent skylight panel.

Another object of the invention is to provide a hydrodynamic skylight apparatus wherein the structure thereof comprises a frame formed from extruded members designed to be cut to any size so as to be adapted to fit any particular opening made in the roof structure.

Still another object of the invention is to provide a hydrodynamic skylight apparatus wherein the skylight structure can be readily constructed having a single or a plurality of light-transmitting panels. Thus, there is established a peripheral frame structure having a continuous inner support flange that includes a sealing member, upon which the skylight panel is mounted, thereby sealing the exterior from the interior of the roof structure.

It is another object of the invention to provide a means to supply a flow of water over the skylight panel, so as to prevent the panel from becoming soiled and thus obscured. The weight of the water causes the panel to become better sealed around the peripheral flange, thereby preventing any leaks from developing. However, the frame structure further includes a lower channel member mounted to the roof structure, and which is designed to capture any water that might leak to the inside. This channel is provided with several discharge or drain holes, which allow water in the channel to drain to the exterior.

It is still another object of the invention to provide a hydrodynamic skylight apparatus of this character that has a frame structure which further defines a reservoir to retain water or other fluids therein. Some forms of the skylight will also include a pump-and-filter system, to allow a continuous circulation of the water over the panel, the filter being designed to remove all foreign particles from the water.

Still a further object of the present is to provide a skylight of this character that includes a spraying device formed along at least two opposite edges of the frame structure, whereby water can be sprayed over the skylight panel. This not only provides a cleansing means, but it also provides an aesthetically pleasing effect resulting from the sunlight passing through the moving water atop the skylight. This movement of the water thus creates a "dancing" effect by the sun's rays as they shine into the interior area below the skylight.

It is a further object of the invention to provide a skylight of this character having relatively few components, making it easy to install, maintain and service.

Still another object of the invention is to provide an apparatus of this character that is relatively inexpensive to manufacture, and that is simple yet rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 3 is a combination cross-sectional and pictorial view of one of the side-frame-structure members;

FIG. 5 is a perspective view of a portion of a side member having a spray bar mounted thereon.

DESCRIPTION OF THE PREFERRED EMBODIMENT

Figure 1:
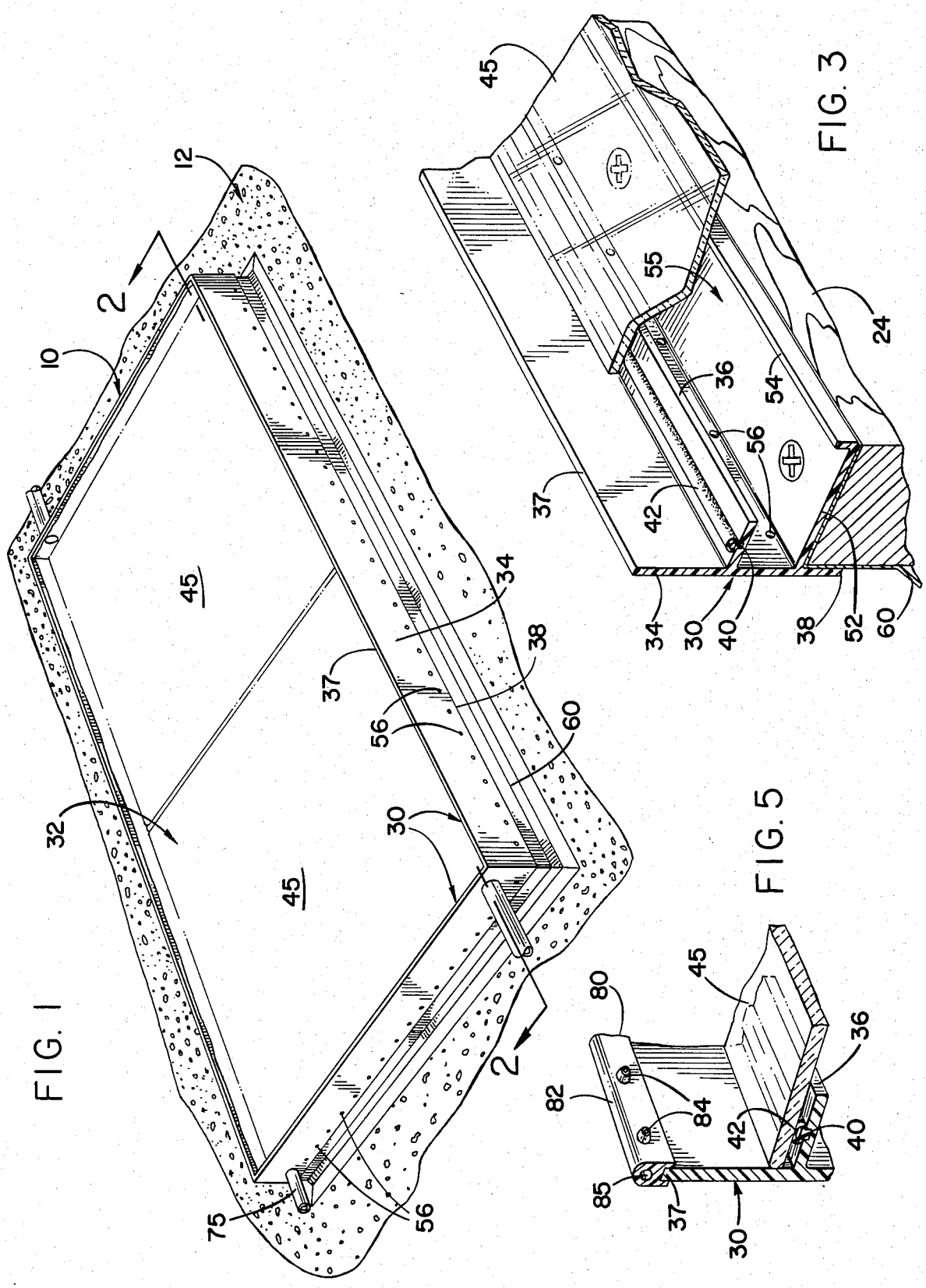
FIG. 1 is a perspective view of the new hydrodynamic skylight apparatus shown mounted to a roof structure.
Figure 2:
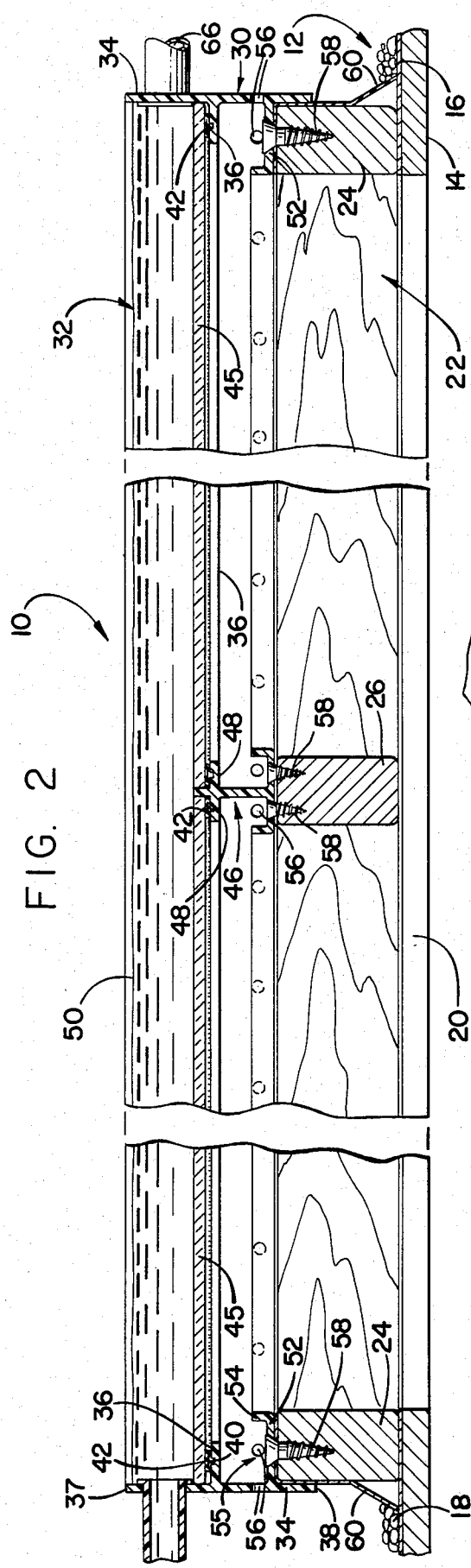
FIG. 2 is an enlarged cross-sectional view taken substantially along line 2—2 of FIG. 1.

Referring more particularly to FIG. 1, there is shown a hydrodynamic skylight apparatus generally indicated by numeral 10. The skylight apparatus is shown mounted to a typical roof 12 of a building, which is also illustrated in FIG. 2.

Roof sub-structures vary, but they are generally first constructed with sheets of plywood 14 covered over with protective tar-paper coating, the finished top structure comprising gravel 18, or other materials such as shingles or tiles. Thus, in order to install the present device, a substantial opening 20 is formed in roof 12 over which the skylight unit 10 is fixedly mounted by means of a supporting box-like framework 22, herein shown comprising wood frame members 24.

When larger skylight units are desired, two panels are required, together with a center-brace member 26 which extends transversely across the longitudinal opening 20.

The hydrodynamic skylight is adapted to allow an intermittent or continuous flow of liquid, preferably water, across its transparent surface so as to provide a means for maintaining the outer surface clean at all times, and to further provide an aesthetically pleasing sunlight effect within the inside area or room below the skylight.

Accordingly, the skylight 10 comprises a substantially rectangular box-like configuration, whereby the four side frame members 30 are connected, so as to aid in defining a sealed reservoir, generally indicated at 32. The side frame members 30 are constructed from an extruded plastic material having an outer vertical wall 34, a support flange member 36 being formed so as to extend inwardly of the frame members 30—thus providing a continuous support rack about the inner surface of wall 34 intermediate the upper and lower edges 37 and 38, respectively. A longitudinal groove 40 is formed along the upper surface of the contiguous flange members 36, the groove being adapted to receive a sealing means such as an elongated rubber seal member 42. Mounted within the defined reservoir and supported by flange members 36 is at least one light-transmitting panel of either glass or plastic, indicated by numeral 45.

In the embodiment shown in the accompanying drawing, a central-support strut 46 (shown in FIGS. 2 and 4) is provided, whereby a pair of skylight panels 45 are employed. Hence, the central-support strut comprises a pair of oppositely disposed support flange members 48 and a sealing means, as heretofore described. Therefore, it can be seen that reservoir 32 is well defined by the upper portions of side walls 34 and light-transmitting panels 45.

In order to support the complete structure as well as any water or fluid 50 in reservoir 32, side wall 34 is further formed with a mounting bracket 52 which extends inwardly, so as to be fixedly secured to the respective wood frame members 24 (as shown in FIG. 3). The outer edge of bracket 52 includes an upturned lip member 54 which defines an inner peripheral channel 55. Channel 55 not only aids in supporting the apparatus in general, but also provides a catchment means, in case water leaks through the sealing means 42. However, a plurality of holes 56 are provided in side wall 34, in order to allow entrapped water to drain to the outside of the structure.

Various means can be employed for securing the apparatus to studs (frame members 24), such as screws 58. It is contemplated that, before the box-like frame structure of the apparatus is placed in position on studs 24, a suitable flashing 60 will be placed over the studs, as seen in FIG. 2. Flashing 60 prevents leakage of water into opening 20—if, for example, it rains, the reservoir overflows, or water drains from the holes 56 in side walls 34.

Figure 4:
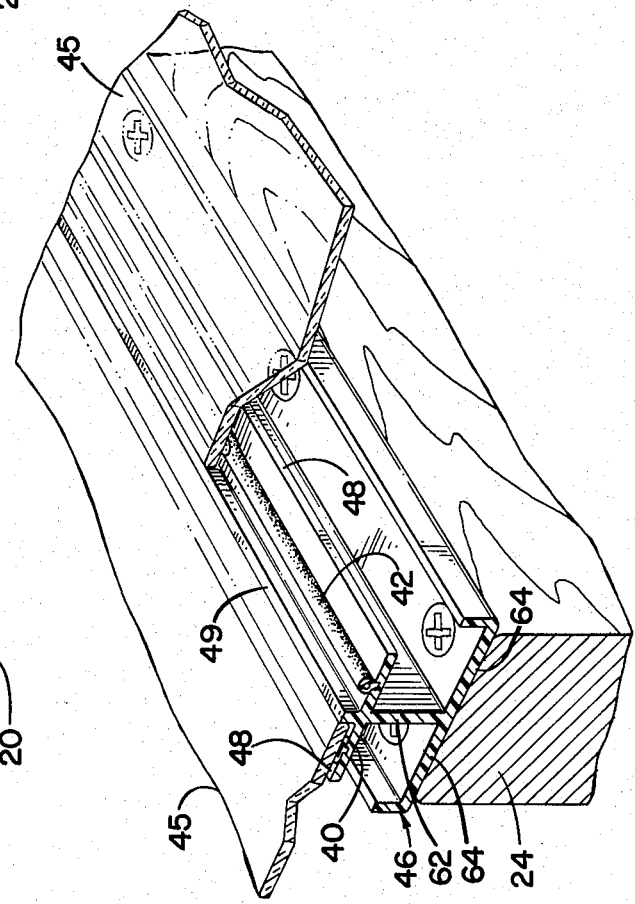
FIG. 4 is a combination cross-sectional and pictorial view of the center-support-strut member employed when two light-transmitting panels are installed in a single framework.

Central-support strut 46 further comprises a center wall member 62 on which is formed the oppositely disposed support flanges 48 adjacent the upper longitudinal edge 49 of the wall 2. The lower end of wall 62 is formed having oppositely extended brackets 64 which define drain channels positioned in each flange member 48 as illustrated in FIG. 4.

FIG. 2 illustrates a pair of transparent or translucent panels composed of either glass or plastic, and supported on the respective support flanges and sealing means. The weight of the panels aids in achieving a sealing action around the peripheral edge thereof. In addition, when water (fluid) 50 is added to the reservoir 32, additional weight is provided—thus effecting a more positive sealing means.

Figure 6:
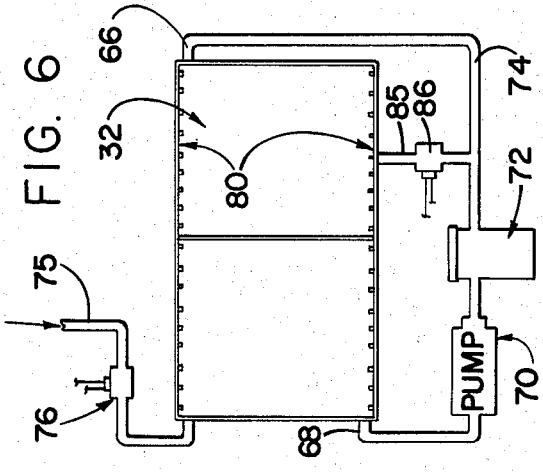
FIG. 6 is a diagram of a simple water-flow system operably attached to a skylight apparatus.

Various arrangements for supplying water to reservoir 32 are contemplated. One arrangement would comprise an inlet 66 and an outlet 68, each being located in a side wall member 34 so as to communicate with reservoir 32, as seen in FIGS. 1, 2 and 6. In FIG. 6, there is shown a pump means 70 and a filter means 72 being interconnected in flow line 74, which connects inlet 66 to outlet 68, whereby water in reservoir 32 can be intermittently or continuously pumped and filtered, thereby eliminating the need for periodic cleaning of the panels—particularly if the panels are disposed in a horizontal plane.

A further arrangement is illustrated which includes a water-supply line 75 having a remote-control-valve means 76. Thus, when additional water is required, valve means can be activated to furnish the necessary water supply to reservoir 32.

Referring to FIG. 5, there is shown a spray means, generally indicated at 80, which comprises a spray bar 82 having a plurality of spaced spray nozzles 84. Spray bar 82 is formed so that it can be secured along the free upper edge 37 of wall 34. The spray bars are positioned on opposite sides of reservoir 32, as seen in the diagram of FIG. 6. A conduit 86, which includes a valve means 86, is connected between the spray bars 82 and the supply line 74.

Hence, one can cause a spray of water to fall against the skylight panels, thus simulating the action of rainfall. The spraying of water creates two effects—firstly, causing a "dancing" rain pattern by the constantly reflective movement of the sun's rays shining through the skylight; and secondly, allowing a transparent panel to be obscured, when desired.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A hydrodynamic skylight apparatus adapted to be mounted in a substantially horizontal plane over an opening in a roof structure, in combination with a reservoir in which water is disposed so as to allow sunlight to shine therethrough and into the associated interior area below said skylight, thereby creating an aesthetic display of sunlight, said combination comprising:

a substantially rectangular frame structure affixed to a roof structure;

at least one light-transmitting-panel member adapted to be supported in said frame structure;

means formed around the peripheral inner surface of said frame structure to support said panel therein;

a reservoir defined by said frame structure and said panel, whereby said water is superposed over said panel to allow sunlight to pass through said water and said light-transmitting panel;

sealing means interposed between said panel and said support means for said panel, in order to prevent fluid from passing therebetween; and a frame-structure-support means adapted to be mounted between said roof structure and said rectangular frame structure, said frame structure comprising:

a continuous side-support wall having an inlet and an outlet located so as to communicate with said reservoir, in order to allow fluid to enter and exit said reservoir under controlled conditions; and fluid-control means interconnecting said inlet and outlet.

2. A hydrodynamic skylight apparatus as recited in claim 1, wherein said fluid-control means comprises:

a pump means whereby said fluid is pumped through said reservoir to cause said fluid to flow over said panel, providing a cleansing action on said panel and preventing foreign matter from accumulating and resting on the surface of said panel; and a filter means attached to said pump means so as to filter said fluid before it is returned to said reservoir.

3. A hydrodynamic skylight apparatus as recited in claim 2, including:

a fluid-supply means connected to said frame structure, in order to furnish fluid to said reservoir; and means to control said fluid-supply means in a selective manner.

4. A hydrodynamic skylight apparatus as recited in claim 3, wherein said panel-support means comprises an inwardly extending flange member integrally formed as part of said continuous side support wall, said sealing means being mounted thereto.

5. A hydrodynamic skylight apparatus as recited in claim 4, wherein said frame-structure-support means comprises a continuous peripheral bracket formed adjacent the lower edge of said side support wall; and means for securing said frame structure to said roof structure.

6. A hydrodynamic skylight apparatus as recited in claim 5, wherein said peripheral bracket defines a drain channel having a plurality of drain holes formed in said side wall thereof, in order to allow fluid accumulated therein to drain to the outside of said frame structure.

7. A hydrodynamic skylight apparatus as recited in claim 6, wherein said frame structure includes:

a pair of juxtaposed light-transmitting panels;

a central-support strut transversely mounted as part of said frame structure;

said central-support strut including a pair of oppositely disposed extending flange members adapted to support said panels along one edge thereof;

a pair of oppositely disposed support brackets adapted to be affixed to said roof structure;

said support brackets defining drain channels for collecting fluid therein, and for draining said fluid to the outside of said frame structure.

8. A hydrodynamic skylight as recited in claim 5, wherein said apparatus includes:

a spray means mounted on opposite sides of said reservoir, whereby fluid is sprayed onto said panel; and valve means to control said fluid flow through said spray means.

9. A hydrodynamic skylight as recited in claim 8, wherein said spray means comprises:

a spray bar adapted to be mounted along the upper edge of said side support wall; and a plurality of spray nozzles attached to said spray bar and spaced longitudinally thereon, whereby fluid is sprayed on said panels, so as to simulate the action of rainfall and thus cause the sun's rays passing through said panels to be in constant motion and to project various reflective patterns and modes.

* * * * *